Oct. 9, 1928.
W. F. EVANS ET AL
1,686,740
BUS BODY
Filed July 24, 1925
2 Sheets-Sheet 1
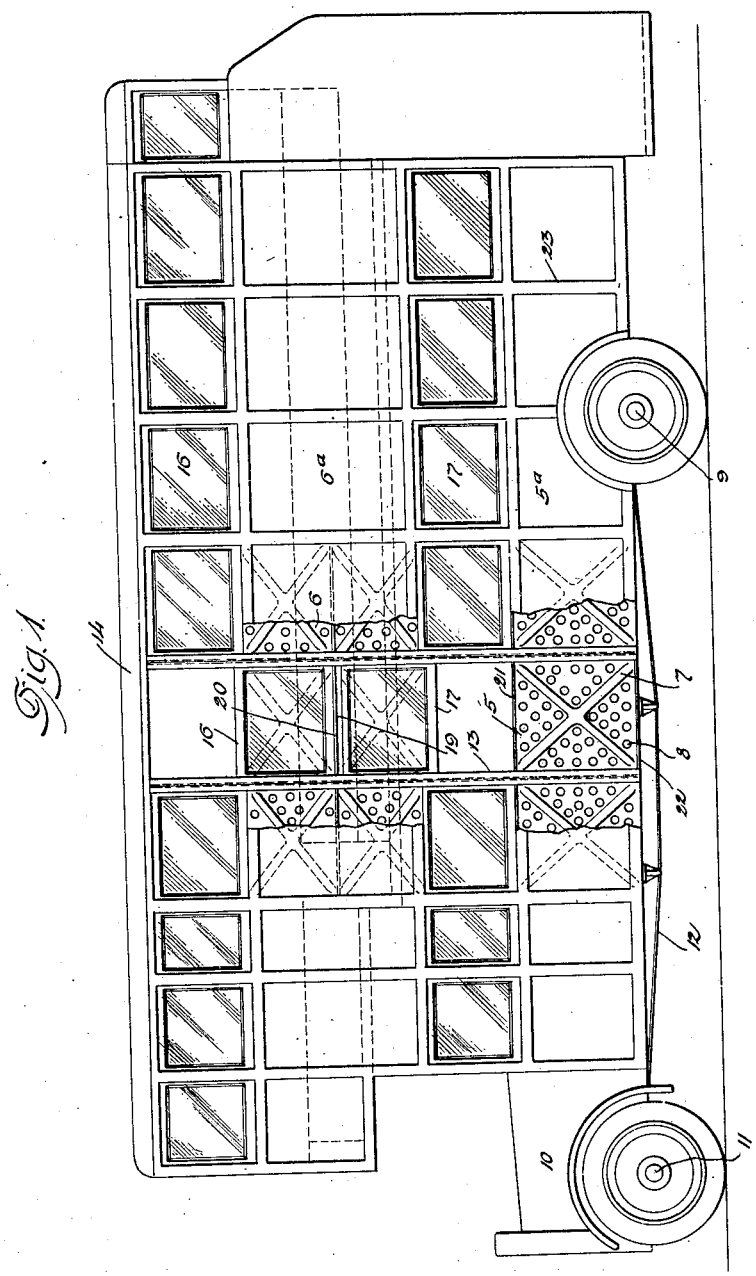

Oct. 9, 1928.  1,686,740
W. F. EVANS ET AL
BUS BODY
Filed July 24, 1925   2 Sheets-Sheet 2
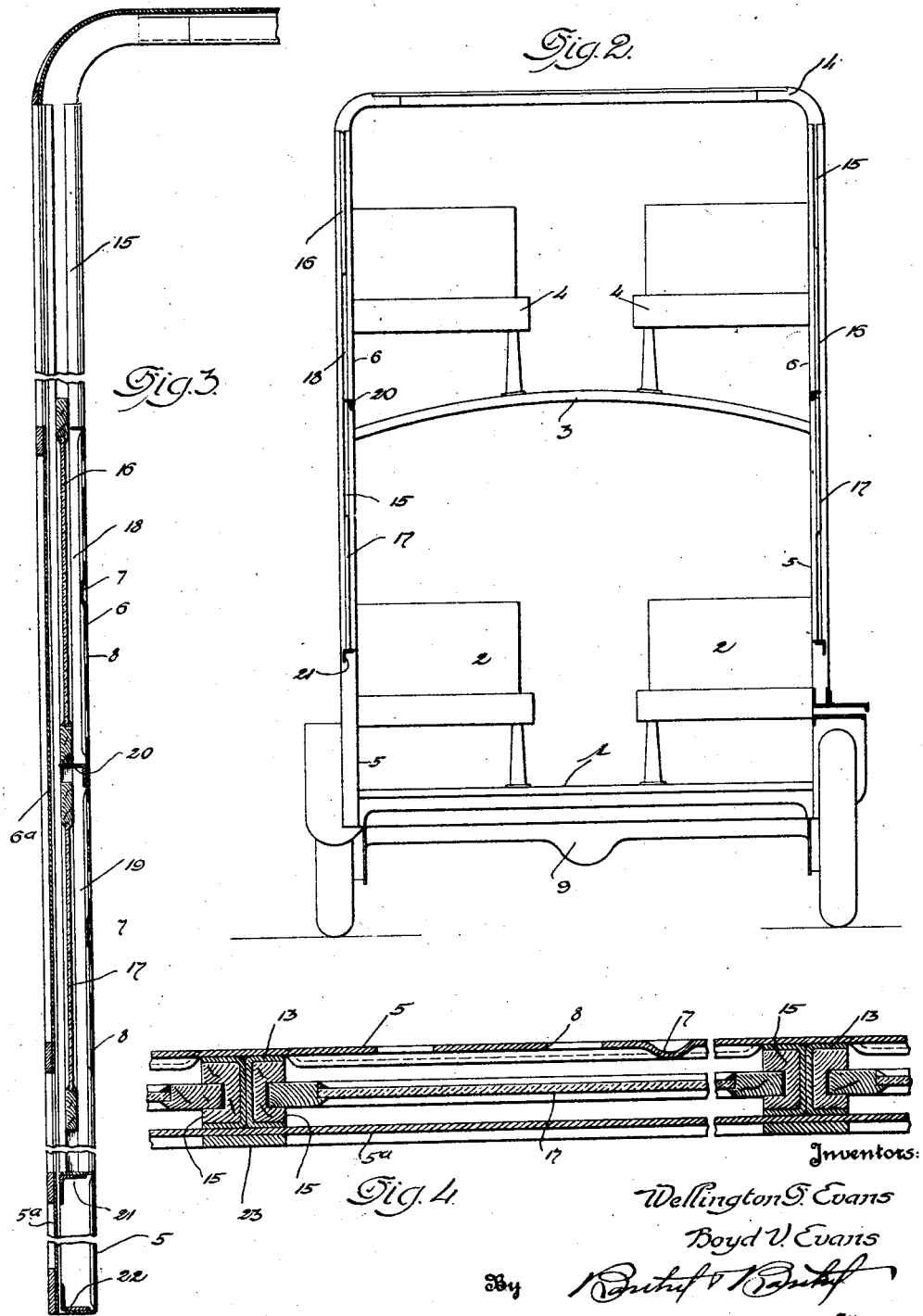

Patented Oct. 9, 1928.

1,686,740

UNITED STATES PATENT OFFICE.

WELLINGTON F. EVANS AND BOYD V. EVANS, OF DETROIT, MICHIGAN.

BUS BODY.

Application filed July 24, 1925. Serial No. 45,758.

In the construction of motor busses and other types of motor vehicles having a long wheel base, a chassis and suitable springs connect the front and rear axle assemblies of the vehicle. The chassis is usually composed of heavy channel side frames connected at intervals by transverse members and as a whole lends considerable weight to a vehicle. This is particularly true in connection with double deck passenger carrying motor busses used in large cities, and our invention aims to eliminate such a heavy chassis and substitute therefor fabricated built-in side frames which will cooperate with a bus body in providing the requisite degree of rigidity or support between the front and rear axle assemblies. The fabricated side frames contribute towards the structure of bus walls and in consequence of said frame being located within the bus walls, it has been found necessary to re-design a portion of a bus body.

Our invention further aims to provide a bus body having comparatively top side walls adjacent the upper deck so that said side walls may receive the window sashes of the upper deck and the sashes of the lower deck. The arrangement of the side frames in the bus body precludes lowering the sashes of the lower deck into the side walls of the bus body, as is the usual practice, therefore, when the usual sash wells are eliminated or occupied by the side frames it becomes necessary to raise the sashes of the lower deck. Since bus bodies having an upper deck must be limited in height, on account of viaducts and other overhead structures, it is impossible to raise rigid sashes of an upper deck and consequently the sashes must be lowered. In other words, the sashes of the upper and lower decks are movable to and from each other and there may be a common well for all of the sashes.

The construction entering into our motor bus will be hereinafter specifically described and then claimed, and reference will now be had to the drawings, wherein Figure 1 is a side elevation of a motor bus having side walls partly broken away to show the framework of the bus body;

Fig. 2 is a vertical cross sectional view of the same;

Fig. 3 is an enlarged vertical sectional view of one of the body side walls, and Fig. 4 is an enlarged horizontal sectional view of a portion of the same.

The motor bus includes a body having a lower deck 1 provided with seats 2, and an upper deck 3 provided with seats 4.

The body walls include built-in girders or lower and upper panels, the lower girders or panels including longitudinal parallel members 5 and the upper panels including longitudinal parallel members 6. All of these longitudinal members are trussed by intersecting pressed out ribs 7 and the members are apertured or of skeleton construction, as at 8, to reduce the weight of the same.

The longitudinal members form the inner faces of the body walls and the outer faces of said walls are formed by cover members 5ª and 6ª disposed parallel and in spaced relation to the longitudinal members 5 and 6.

The lower longitudinal members 5 extend throughout the length of the bus body and constitute the sole supporting means thereof between the rear axle assembly 9 and the power plant 10 and front axle assembly 11, so that it is unnecessary to use any chassis. However, the front and rear axle assemblies may be additionally tied together by tie rods 12 arranged as trusses under the longitudinal members 5.

The member 5 of the lower panel is connected to the member 6 of the upper panel by vertically disposed channel members 13 arranged back to back as best shown in Fig. 4, said channel members spacing the longitudinal members 5 and 6 from the cover members 5ª and 6ª of each panel so as to form practically a hollow side wall construction for the bus body. The channel members 13 extend above the upper panels of the bus body and may support a roof or inclosure 14 for the upper deck.

Mounted in the vertical channel members 13 are inner channel members 15 affording sash ways for sashes 16 and 17. The longitudinal members 6 provide upper panels of greater depth than the lower panels and in the upper panels are sash wells 18 and 19 adapted to receive the sashes 16 and 17 respectively. The sash wells may be partly separated by transverse members 20 serving as stops or abutments, particularly for the upper window sashes 16 which are adapted to be lowered into the sash wells 18, while the lower sashes 17 are adapted to be raised into the wells 19.

The longitudinal members 5 of the lower panels may be reinforced by transverse members 21 and 22, the former affording sills for the lower windows.

The cover members 5ª and 6ª may correspond in size to the inner panels 5 and 6 or may be made of lighter material simply for exterior finish purposes, in which case suitable pilasters or other members 23 may be secured to the cover members to impart a finished appearance to the bus body. With the inner and outer panels of each wall connected by the vertical channel members there is somewhat of a box girder construction throughout the length of the bus body and it is obvious that there is ample support for the upper deck of the body.

We attach considerable importance to the fact that our motor bus is devoid of the usual chassis and that we have built-in girders as a substitute therefor, all of which permits of a bus body being constructed with a long low wheel base.

It is obvious that suitable provision may be made for any side entrances, side space, fenders and the like, and while in the drawings there is illustrated a preferred embodiment of our invention it is understood that the structural elements are susceptible to such variations and modifications as fall within the scope of the appended claims.

What we claim is:—

1. A bus body having side walls provided with upper and lower windows, said side walls including panels, one of greater depth than the other affording window sash receiving wells above the lower windows.

2. In a bus body devoid of a chassis, upper and lower side panels with the lower panels serving as longitudinal body supporting girders, the upper panel affording sash wells, and uprights connecting said panels and providing upper and lower sash ways.

3. A double deck motor bus having upper and lower windows, said bus having a side wall construction affording individual adjacent wells between the upper windows and the lower windows, each well being adapted to receive a lowered window sash and a raised window sash.

4. A bus body having lower windows and an inclosed upper deck provided with windows, said bus including a side wall construction affording wells between the two sets of windows and in line with the windows, whereby to receive lowered sashes of the upper deck windows and sashes of the lower windows.

5. A bus body having windows, said body including wall uprights, trussed inner panel members connected to said uprights, outer panel members connected to said uprights, and transverse members connecting said uprights, some of said inner and outer panel members forming adjacent window sash wells separated by some of said transverse members.

In testimony whereof we affix our signatures.

WELLINGTON F. EVANS.
BOYD V. EVANS.